A. M. POWERS.
DUST GUARD FOR BEARINGS.
APPLICATION FILED OCT. 31, 1914.

1,191,137.

Patented July 11, 1916.

WITNESSES:
Renée Pruine
Fred White

INVENTOR:
Alexander M. Powers,
By Attorneys,
Fraser & Myers

UNITED STATES PATENT OFFICE.

ALEXANDER M. POWERS, OF NEW YORK, N. Y.

DUST-GUARD FOR BEARINGS.

1,191,137.   Specification of Letters Patent.   Patented July 11, 1916.

Application filed October 31, 1914. Serial No. 869,636.

*To all whom it may concern:*

Be it known that I, ALEXANDER M. POWERS, a citizen of the United States of America, residing in borough of Brooklyn, county of Kings, city and State of New York, have invented certain new and useful Improvements in Dust-Guards for Bearings, of which the following is a specification.

My invention relates to dust guards for bearings, and is particularly adapted to provide means for excluding dust, moisture, or foreign substances from anti-friction bearings.

It has for its object to provide an improved construction of dust guard which at all times will efficiently exclude dust and moisture from the bearing, and will also enable the oil or grease within the housing to be situated at a high level.

To this end my invention consists in a dust excluding ring which is formed of tough material having a slight resiliency such as rawhide, and which surrounds and is at all times in contact with the shaft, being supported in fixed position in relation thereto. Also said ring when in position is inclined relative to the shaft, so that as the dust excluder wears in time, its resiliency will maintain it at all times in contact with the shaft surface.

My invention likewise has for its object to provide an improved construction of retaining means for said dust guard which may be sold as a unit and will effectively perform its function when produced in a series of graduated sizes.

A desirable form in which my invention may be employed is illustrated in the accompanying drawing, wherein,—

Figure 1:
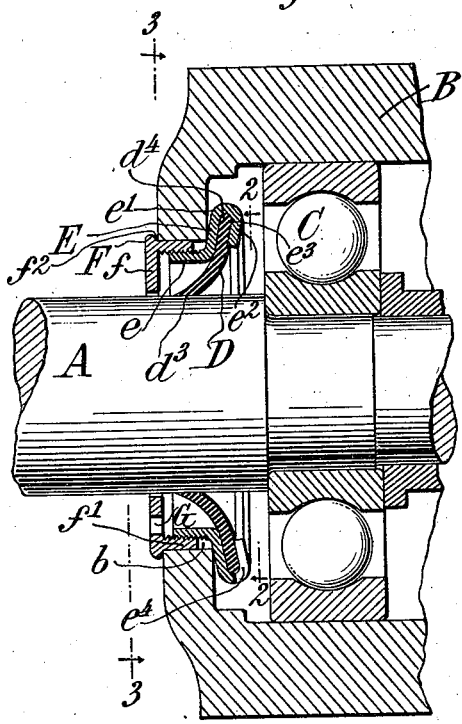
Figure 2:
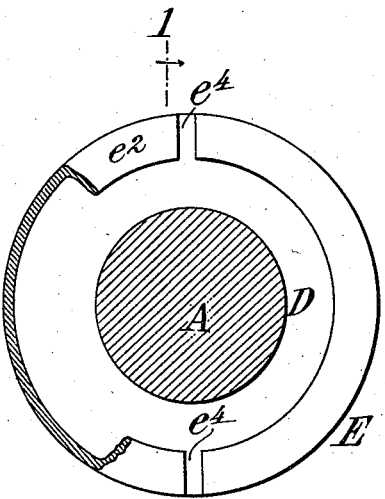
Figure 3:
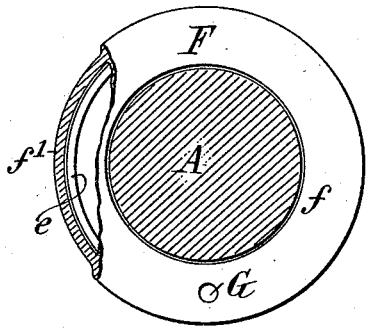
Figure 5:
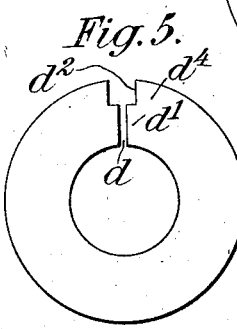
Figure 4:
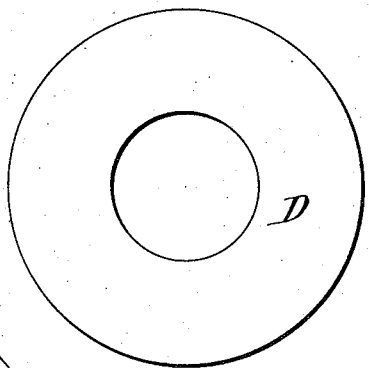

Figure 1 illustrates a cross-section on the line 1—1, Fig. 2, of my invention applied to a conventional form of anti-friction bearing. Fig. 2 is a cross-section thereof on the line 2—2, Fig. 1, looking toward the left, the housing being omitted and part of the flange on the holder being broken away. Fig. 3 is a cross-section on the line 3—3, Fig. 1, looking to the right, part of the flange on the cap being broken away. Figs. 4 and 5 illustrate various forms of dust excluders, Fig. 5 being on a reduced scale.

My invention is illustrated as applied to an anti-friction bearing employing balls, and it may well be used with this type, or equally well with other types of anti-friction bearings, such as roller bearings. In the type illustrated one bearing member is composed of the shaft A and the other is the housing B, between which are the balls C. Interposed between these members, so as to effectually exclude dirt and dust from the anti-friction devices, is my improved dust guard which is composed of a ring D which is composed of tough material which will not readily wear in use and is also possessed of sufficient resiliency to enable it at all times to remain in contact with the shaft A and to exert slight pressure against the same, whereby the wear of the parts in use is compensated for, and the dust excluder D is at all times maintained in operative contact with the bearing member A. Although I have referred to the dust excluder D as a ring, it is not necessarily formed as a continuous piece as in Fig. 4, as it may equally well be split, as at $d$ in Fig. 5. In use in the form shown in Fig. 5 the tongues $d^1$ will overlap when the dust excluder is inserted in the holder, and the edges of the shoulders $d^2$ will abut therein so as to be maintained in the holder without overlapping which would produce an objectionable double thickness thereof.

The dust excluder D is mounted in its holder so that its inner edge $d^3$ which contacts with the bearing element A is inclined forwardly from its rear or supporting portion $d^4$, so that the said inner edge is in a different plane than the supporting edge. This may well be accomplished by flaring the said dust excluder, and if the dust excluder is formed of rawhide, which material I prefer, this may be treated in the proper manner known to those skilled in such art to produce a permanent set or flare therein for this purpose. Thereby it will be perceived that the slight but sufficient amount of resiliency which rawhide possesses added to the inclined position of the same with reference to the axis of the bearing member A will tend to efficiently hold the inner edge of said dust excluder in contact with the shaft, and enable it at all times to perform its function as stated. Another feature of my invention consists in the means whereby the said dust excluder is easily inserted in position in the housing B, and is efficiently maintained therein. For this purpose I provide a holder E which has suitable means for securing it in position, such as the threaded sleeve $e$. A flange $e^1$ projects outwardly from said sleeve, and at its outer edge is bent over at $e^2$, providing a channel $e^3$ and within this channel the rear or supporting edge $d^4$ of the dust excluder D is mounted. Preferably the edge $e^2$ will be firmly swaged or pressed against the dust excluder, so that the same shall be firmly held in position. To enable the flange to be conveniently turned over, I may slot the same as at $e^4$.

Upon the outer part of the housing B is located a cap F. Upon this is formed an annular flange $f$ which is adapted to encircle the bearing member A and fit with slight clearance thereto. From the rear wall of the flange $f$ a sleeve $f^1$ projects, which is threaded for engagement with the sleeve $e$ of the holder. The housing B is centrally apertured at $b$, and this aperture is machined to fit the sleeve $f^1$. It will be observed that the flange $e^1$ is not perpendicular to the sleeve $e$, but is at a slight angle thereto, and this accomplishes two objects. In the first place, it enables the holder E to be by its threaded engagement with the cap F drawn tightly up against the machined shoulder on the inner edge of the aperture $b$, thereby locking the two threaded members by a common frictional contact with the housing B and preventing rotation of same, and in the next place, the channel $e^3$ is thereby enabled to support the dust excluder D so that the same shall project at an incline toward the bearing member A and not perpendicular thereto. By means of the foregoing connection between the holder and the inner wall of the housing, I am enabled to maintain the oil in the housing at a higher level than usual, which is highly desirable.

The dust excluder D and its holder E, and the cap F, are usually sold as a unit. They can be easily made to standard sizes to fit corresponding sizes of cold rolled steel shafts. Shafts of intermediate sizes which are frequently found, may also readily be fitted by reason of the fact that the flange $f$ may have varying degrees of clearance from its shaft and such intermediate sizes properly fitted with the dust excluders by providing dust excluders of inner diameters corresponding to the shaft and locating them in the holders. In actual practice a number of intermediate sizes of shafts may be fitted with standard sizes of dust guards by the simple expedient of providing dust excluders of the desired size and locating them in standard sizes of holders and caps.

The wall of the housing B is liable to have varying thicknesses, and in order to compensate therefor the cap F and holder E are threaded throughout a greater portion of their length than is actually required. The rear surface of the wall of the housing B is usually rough, and the angular disposition of the flange $e^1$ of the holder E accomplishes the desirable object of keeping its finished surface out of contact with the rough surface of the said wall.

The invention is illustrated as being used in connection with a horizontal shaft, but the shaft may be either horizontal or vertical, both being frequently met with, and both equally requiring dust guards. In the case of a vertical shaft, the dust excluder D, by reason of its contact with the shaft A, will efficiently prevent leakage of the lubricant, whether oil or grease. The dust guard herein illustrated will frequently be used in locations where there is considerable splashing of liquid, and this may pass between the flange $f$ and the shaft A. In such case a drain hole G is provided at the lower part of the cap F to permit the escape of such fluid.

In practice the fit between the sleeve $f^1$ of cap F and the wall of the housing B will close, to provide frictional engagement, which, because of the large contact between the parts, will tend to prevent rotation of the same relative to the housing B, by reason of the contact of the dust excluder with the shaft, and this is true whether the shaft is a rotating element and the holder E fixed, or vice versa. Further means are provided to insure the fixed position of the parts relative to the housing, consisting of a slight bead or rib $f^2$ upon the outside of the cap F which is inclined toward the housing, and which in coöperation with the inclined face of the holder E when the two are screwed together, tends to grip against the wall of the housing and hold the parts against movement relative thereto. The cap F and holder E are preferably formed by me of iron, as I found this material well adapted for this purpose. The dust excluder D is preferably formed of non-metallic material, and my preferred material is rawhide.

It will be perceived from the foregoing that the important feature of my invention consists in the provision of the inclined dust excluder which is formed of tough material having a slight amount of resiliency, for which purpose rawhide is prefererd by me as the best material now known to me, but to which material I do not desire to limit myself, as other materials may be used within the limits of the appended claims. The particular means illustrated by me for retaining the said dust excluder are the best means for this purpose now known to me, but my invention is not necessarily limited to the employment of these particular means as these means may be modified and other and equivalent devices substituted therefor within the limits of the appended claims, nor is my invention limited to use in connection with the particular type of bearing illustrated, as it may be equally useful with other bearings.

What I claim is:—

1. A shaft, a housing revoluble relative thereto and through which the shaft extends, bearings between the shaft and housing, a dust excluder comprising an annular holder secured in said housing and having ring retaining means inclined relative to said shaft, a ring of non-metallic tough material having resiliency, mounted in said holder and adapted to have its inner edge contact with the shaft, said ring inclined from its holder to its point of contact with the shaft, and having a tendency to spring toward said shaft whereby and by reason of its resiliency it is adapted to remain in contact with said shaft and compensate for wear.

2. A shaft, a housing revoluble relative thereto and through which the shaft extends, bearings between the shaft and housing, and a dust excluder comprising an annular holder secured in said housing and having ring retaining means inclined relative to said shaft, a ring of rawhide, mounted in said holder and adapted to have its inner edge contact with the shaft, said ring inclined from its holder to its point of contact with the shaft, and having a tendency to spring toward said shaft whereby and by reason of its resiliency it is adapted to remain in contact with said shaft and compensate for wear.

3. In a dust guard for bearings, a housing for the outer bearing members provided with a central aperture for the inner bearing member, an annular cap adapted to embrace the inner bearing member and having a sleeve adapted to extend within said aperture, a holder within the housing having a sleeve adapted to extend outward through said aperture and threaded to said cap sleeve, an outwardly extending flange on said holder, having its edge turned inwardly forming a channel, and a dust excluding ring mounted in said channel and adapted to bear against the inner bearing member.

4. In a dust guard for bearings, a housing for the outer bearing members provided with a central aperture for the inner bearing member, an annular cap adapted to embrace the inner bearing member and having a sleeve adapted to extend within said aperture, a holder within the housing having a sleeve adapted to extend outward through said aperture and threaded to said cap sleeve, an outwardly extending flange on said holder, having its edge turned inwardly forming a channel, and a dust excluding ring constructed of non-metallic tough material having resiliency, mounted in said channel and inclined toward the inner bearing member and adapted to contact therewith.

5. In a dust guard for bearings, a housing for the outer bearing members provided with a central aperture for the inner bearing member, an annular cap adapted to embrace the inner bearing member and having a sleeve adapted to extend within said aperture, a holder within the housing having a sleeve adapted to extend outward through said aperture and threaded to said cap sleeve, an outwardly extending flange on said holder, having its edge turned inwardly forming a channel, and a dust excluding ring constructed of rawhide, mounted in said channel and inclined toward the inner bearing member and adapted to contact therewith.

6. In a dust guard, a holder for a dust excluder comprising an integral annular sheet metal frame having an inwardly opening channel at the outside of said frame for said dust excluder, and a dust excluding ring of tough material having resiliency, mounted in said channel, and flaring or inclined inwardly, whereby its inner or bearing edge is in a different plane than its outer or supporting edge.

7. In a dust guard, a holder for a dust excluder comprising an annular sheet metal frame having an inwardly opening inclined channel at the outside of said frame for said dust excluder formed by turning over the outer edge of said frame, and a dust excluding ring of rawhide, mounted in said channel and flaring or inclined inwardly, whereby its inner or bearing edge is in a different plane than its outer or supporting edge.

8. In a dust guard, an annular cap having a perforated inner flange and a threaded sleeve, a holder having a threaded sleeve adapted to engage said cap sleeve and an outwardly projected flange, having its outer edge turned over, forming a channel, and a dust excluder mounted in said channel.

9. In a dust guard, an annular cap having a perforated inner flange and a threaded sleeve, a holder having a threaded sleeve adapted to engage said cap sleeve, and an outwardly projected flange, having its outer edge turned over forming a channel, and a dust excluding ring of non-metallic tough material having resiliency, mounted in said channel, and flaring or inclined inwardly, whereby its inner or bearing edge is in a different plane than its outer or supporting edge.

10. In a dust guard, an annular cap having a perforated inner flange and a threaded sleeve, a holder having a threaded sleeve adapted to engage said cap sleeve and an outwardly projected flange, having its outer edge turned over forming a channel, and a dust excluding ring of rawhide, mounted in said channel and flaring or inclined inwardly, whereby its inner or bearing edge is in a different plane than its outer or supporting edge.

11. In a dust guard, an annular cap having a perforated inner flange and a threaded sleeve, a holder having a threaded sleeve adapted to engage said cap sleeve, and an outwardly projected flange, having its outer edge turned over forming a channel, and having slots in said turned-over edge, and a dust excluder mounted in said channel.

In witness whereof, I have hereunto signed my name in the presence of two subscribing witnesses.

ALEXANDER M. POWERS.

Witnesses:
HENRY M. TURK,
FRED WHITE.